United States Patent [19]

Amsallen

[11] Patent Number: 5,479,345
[45] Date of Patent: Dec. 26, 1995

[54] METHOD AND APPARATUS FOR SELECTING SHIFT POINTS IN AN AUTOMATED MECHANICAL TRANSMISSION

[75] Inventor: Marcel Amsallen, Kalamazoo, Mich.

[73] Assignee: Eaton Corporation, Cleveland, Ohio

[21] Appl. No.: 146,998

[22] Filed: Nov. 2, 1993

[51] Int. Cl.[6] .................................................. B60K 41/18
[52] U.S. Cl. ........................................................... 364/424.1
[58] Field of Search ................................. 364/424.1, 442; 74/866

[56] References Cited

U.S. PATENT DOCUMENTS

| | | | |
|---|---|---|---|
| 4,517,646 | 5/1985 | Magnusson et al. | 364/424.1 |
| 4,564,906 | 1/1986 | Stephan et al. | 364/424.1 |
| 4,789,936 | 12/1988 | Kurihara et al. | 364/424.1 |
| 5,172,609 | 12/1992 | Nitz et al. | 74/866 |
| 5,241,476 | 8/1993 | Benford et al. | 364/424.1 |
| 5,272,939 | 12/1993 | Markyvech et al. | 74/866 |
| 5,289,740 | 3/1994 | Milunas et al. | 74/866 |
| 5,323,318 | 6/1994 | Hasegawa et al. | 364/424.1 |
| 5,406,862 | 4/1995 | Amsallen | 74/336 R |

Primary Examiner—Kevin J. Teska
Assistant Examiner—Susan Wieland
Attorney, Agent, or Firm—Brooks & Kushman

[57] ABSTRACT

A method and apparatus for selecting gear shift points wherein vehicle speed and grade are monitored by sensors which provide data which is used to calculate vehicle acceleration adjusted to compensate for the effect of vehicle grade. A gross vehicle weight value is determined from the adjusted acceleration value. Based on the determined gross vehicle weight and the existing grade, the horse power required to sustain the current GVW and grade with zero acceleration is calculated. Also the current GVW and grade are used to determine the rate of vehicle speed loss during the torque interrupt period in order to predict the engine speed in the new gear and calculate the horse power available from the engine at shift completion. If the predicted engine speed is above a predetermined minimum and if the horse power available from the engine at completion of the shift is equal to or greater than the horse power required to maintain the current vehicle speed, the shift is permitted, otherwise the shift is not permitted and the measurements and calculations necessary to make the shift point decision are repeated. The minimum predicted engine speed may be adjusted to reflect driver demand as represented by throttle position.

14 Claims, 5 Drawing Sheets

METHOD AND APPARATUS FOR SELECTING SHIFT POINTS IN AN AUTOMATED MECHANICAL TRANSMISSION

TECHNICAL FIELD

This invention relates to automated mechanical transmissions; for motor vehicles and more particularly to a method and apparatus for optimizing the selection of gear shift points by considering present vehicle operating conditions such as grade and load.

BACKGROUND ART

There are several vehicle operating condition which influence the optimum points for shifting gears in a torque interrupt transmission system. The conditions which have a major impact are, the gross vehicle weight (GVW) and the grade or inclination of the road surface. When these two major components are known it is possible to identify the optimum shift point which will support the current combination of vehicle operating conditions and optimize fuel efficiency. While grade can be measured directly with an inclinometer, GVW is not readily available.

One prior approach to shift point selection employs tables stored in memory that relate shift point to throttle position and vehicle speed. The shift points are not adjusted to reflect vehicle operating conditions such as load or grade. An attempt to incorporate load as a factor in shift point selection is disclosed in U.S. Pat. No. 4,789,936 wherein the nominal shift points stored in a table are corrected for calculated load. The load is calculated based on vehicle velocity and accelerator movement measurements. Unfortunately, the effects of load on shift point decisions is different than the effects of grade, and moreover the determination of load without respect to grade is flawed.

SUMMARY OF THE INVENTION

In view of the above it is an object of the present invention to provide a method and apparatus for identifying the transmission shift point and initiating a gear shift based on existing grade and gross vehicle weight or load.

It is another object of the present invention to provide a method and apparatus for identifying the transmission shift point and initiating a gear shift based on existing grade and gross vehicle weight wherein the gross vehicle weight is determined as a function of the acceleration of the vehicle adjusted to compensate for the grade of the vehicle at the time the acceleration was determined.

In accordance with the present invention the vehicle speed and grade are monitored by sensors which provide data to a computer. The computer is programmed to calculate vehicle acceleration from the measured speed and to determine the corresponding acceleration value if the vehicle were on a zero grade or level roadway. In other words the actual acceleration is adjusted to compensate for the effect of vehicle grade. A gross vehicle weight value is then determined from the adjusted acceleration value. Based on the determined gross vehicle weight and the existing grade, the horse power required to sustain the current GVW and grade with zero acceleration is calculated. Also the current GVW and grade are used to determine the rate of vehicle speed loss during the torque interrupt period in order to predict the engine speed in the new gear and calculate the horse power available from the engine at shift completion. If the horse power available from the engine at completion of the shift is greater than the horse power required to maintain the present vehicle speed, the shift is permitted, otherwise the shift is not permitted and the measurements and calculations necessary to make the shift point decision are repeated.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
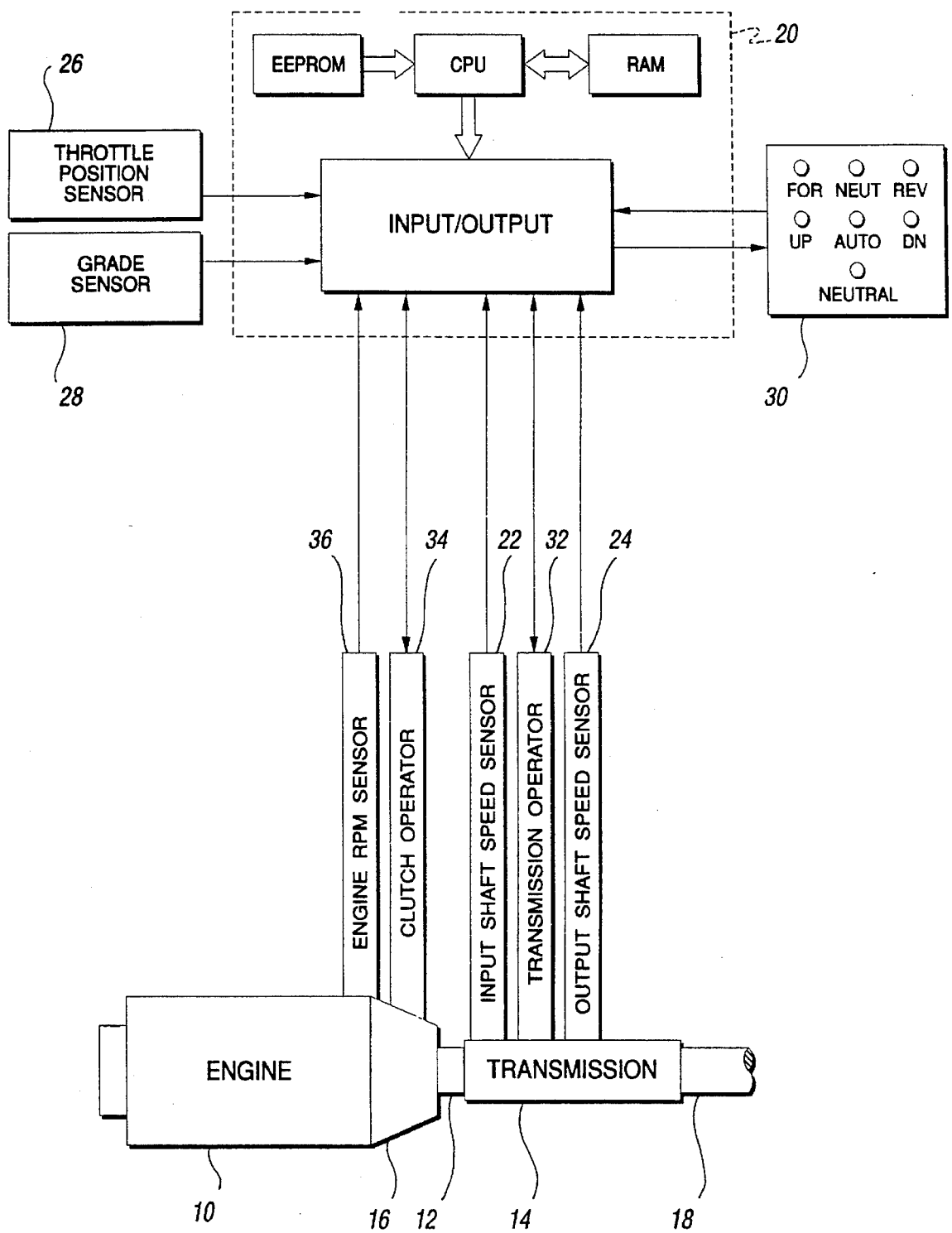
FIG. 1 is a block diagram of the apparatus of the present invention.

Referring now to the drawings and initially to FIG. 1, the vehicle engine generally designated 10 is selectively coupled to the input shaft 12 of a transmission 14 by a friction clutch mechanism 16. The transmission 14, when coupled to the engine 10 drives an output shaft 18 at a speed which is reduced relative to the speed of the input shaft 12 by the gear ratio selected. The shaft 18 is connected to a vehicle's drive wheels by a differential mechanism or the like. Transmission 14 may be a range type compound transmission such as disclosed in U.S. Pat. Nos. 3,105,395; 3,283,613 and 4,754,665, the disclosures of which are hereby incorporated by reference.

A programmable electronic control unit (ECU) generally designated 20, receives analog input data from an input shaft speed sensor 22, indicative of engine RPM when the clutch 16 is engaged, and from a transmission output shaft speed sensor 24, which is directly proportional to vehicle speed. A sensor 26 provides input to the ECU 22 proportional to throttle position, while a sensor 28, which may be an inclinometer or similar device, provides input to the ECU 22 indicative of the grade of the surface upon which the vehicle is travelling.

The ECU 20 also receives transmission gear ratio commands from a driver control console 30 and provides control signals to the console 30 for feedback to the operator. The console 30 may include indicator lamps which indicate, when energized, that the transmission is in a forward (FOR), neutral (NEUT) or reverse (REV) drive, respectively and may include manual pushbuttons which allow the operator to select an upshift (UP), automatic preselection mode (AUTO) or a downshift (DN) respectively. A pushbutton (NEUTRAL) allows selection of a shift into neutral.

The ECU 22 includes the usual central processing unit (CPU), input/output unit (I/O), random access memory (RAM), and read only memory (ROM) which may be at least partially electrically erasable programmable read only memory (EEPROM). The ROM stores the program for controlling a transmission operator 32 to effect shifting of the transmission in response to vehicle operating conditions or commands from the console 30. The ROM also stores data in various tables for use by the CPU. The ECU 20 receives feedback from the operator 32 as well as engine RPM data from a speed sensor 36.

The clutch mechanism 16 includes the usual friction clutch which can be moved from a fully disengaged position to a fully engaged position by a clutch operator 34 that is controlled by signals from the ECU 20. Alternatively, a manually actuated clutch may be employed.

Figure 2:
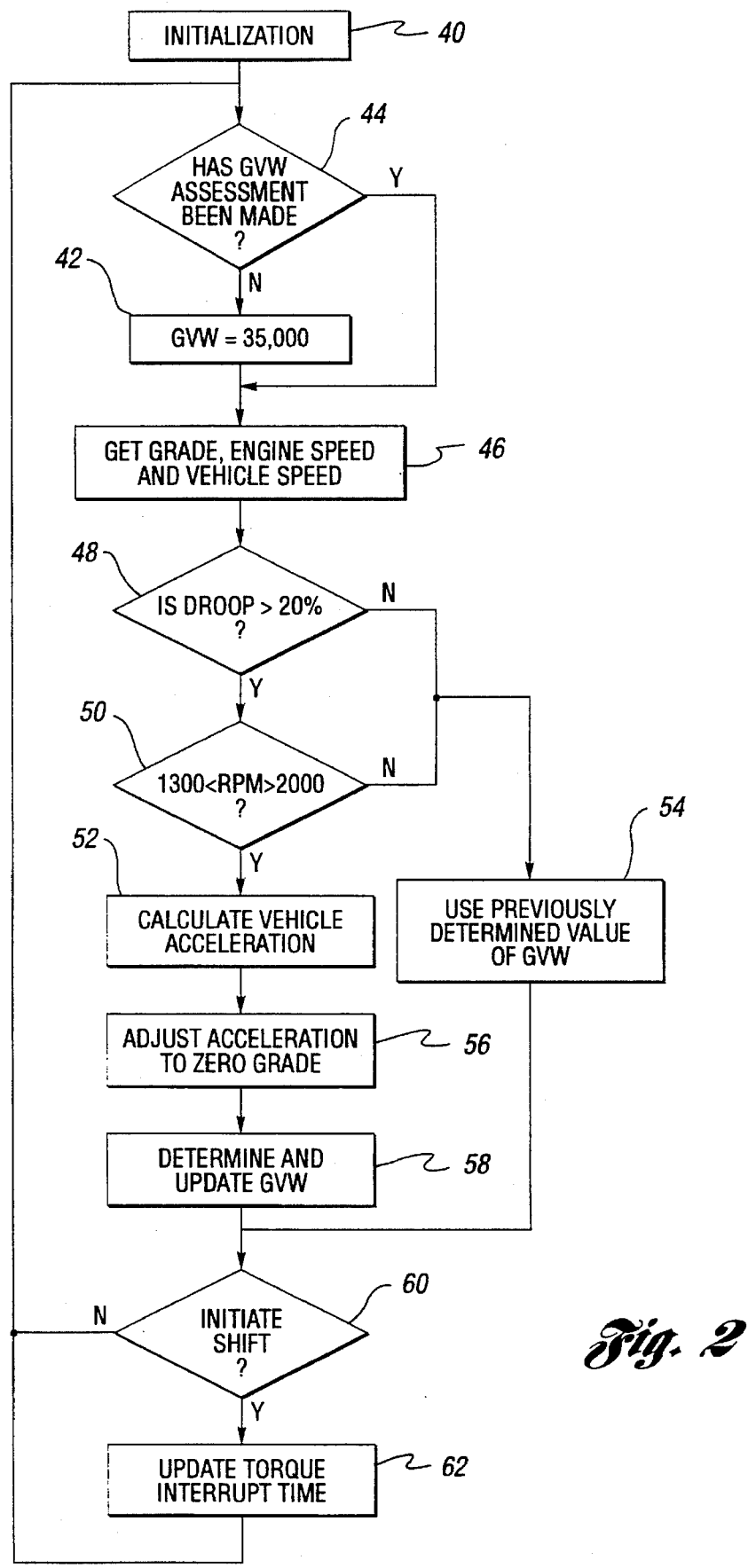
FIG. 2 is a flow chart of the computer program used in the present invention.

Referring now to FIG. 2, a flow chart of the routine for controlling the selection of the transmission shift points is shown. This routine represents the basic logical flow starting with initialization of certain variables at power up, through the process of determining the gross vehicle weight based upon grade and vehicle acceleration, to the shift point calculation and shift decision. The point in time when the grade and acceleration data is available to calculate GVW is generally not the same point in time when the actual shift is performed. This is because the conditions necessary to calculate GVW will be present only for brief periods during vehicle acceleration from rest. The grade measurement and shift point calculation procedure are therefore repeated continuously and are updated at the program loop cycle of, for example, 10 msec.

With reference to FIG. 2, when the system is powered up for the first time, the system should operate according to the requirement of the system specification as indicated at initialization block 40. For example, the specification may require a torque interrupt time for a rail change (TITRC) of less than 0.95 seconds and a torque interrupt time for a non-rail change (TITNRC) of less than 0.75 seconds. These torque interrupt times are used as a baseline and are continuously monitored during vehicle operation. Any deviation is stored in EEPROM. Also, GVW is initialized to 35,000 pounds and this value is used as the default GVW value, as indicated in block 42, in all shift point calculations until the appropriate conditions are present for an actual GVW determination to be made. For example the first determination of GVW may set a flag, which flag is then checked by the decision block 44 to determine whether the default GVW should be used. Grade generally has the greatest influence on shift point selection and optimum performance may be compromised until a determination of GVW has been made. However, the proper conditions for GVW determination should exist after the first 1–2 upshift and any upshift thereafter.

At block 46 the latest input data on the grade of the surface on which the vehicle is traveling and the engine and vehicle speed on this grade is retrieved. The shift point selection is based on GVW which in turn is based on vehicle acceleration on a flat surface or zero grade. However, there are several other factors that can influence vehicle acceleration besides the grade and gross vehicle weight. These factors include driver operation of the throttle pedal and the characteristics of the all speed governor. For example, the driver can control vehicle acceleration by depressing the throttle pedal very slowly. The all speed governor attempts to achieve a particular engine speed for a particular throttle position and will reduce fuel flow as the engine speed approaches the speed being commanded by the current throttle position. This in turn will reduce vehicle acceleration. To insure that the vehicle acceleration is not influence by either the driver, or the all speed governor, and is a true indicator of the gross vehicle weight and grade environment, the conditions shown in decision blocks 48 and 50 are imposed and must be met before a new GVW value will be determined.

As indicated in blocks 48 and 50, if droop is greater than 20% and the engine speed is between 1300 and 2000 RPM, the acceleration of the vehicle for the existing grade is calculated at block 52 based on the vehicle speed data. Otherwise, the previously determined value of GVW is used as indicated in block 54. Droop is defined, for a given throttle position, as:

$$\% \text{ Droop} = \frac{N_0 - N_C}{N_0}$$

where:
  $N_0$=engine speed at zero load
  $N_C$=current engine speed

Figure 3:
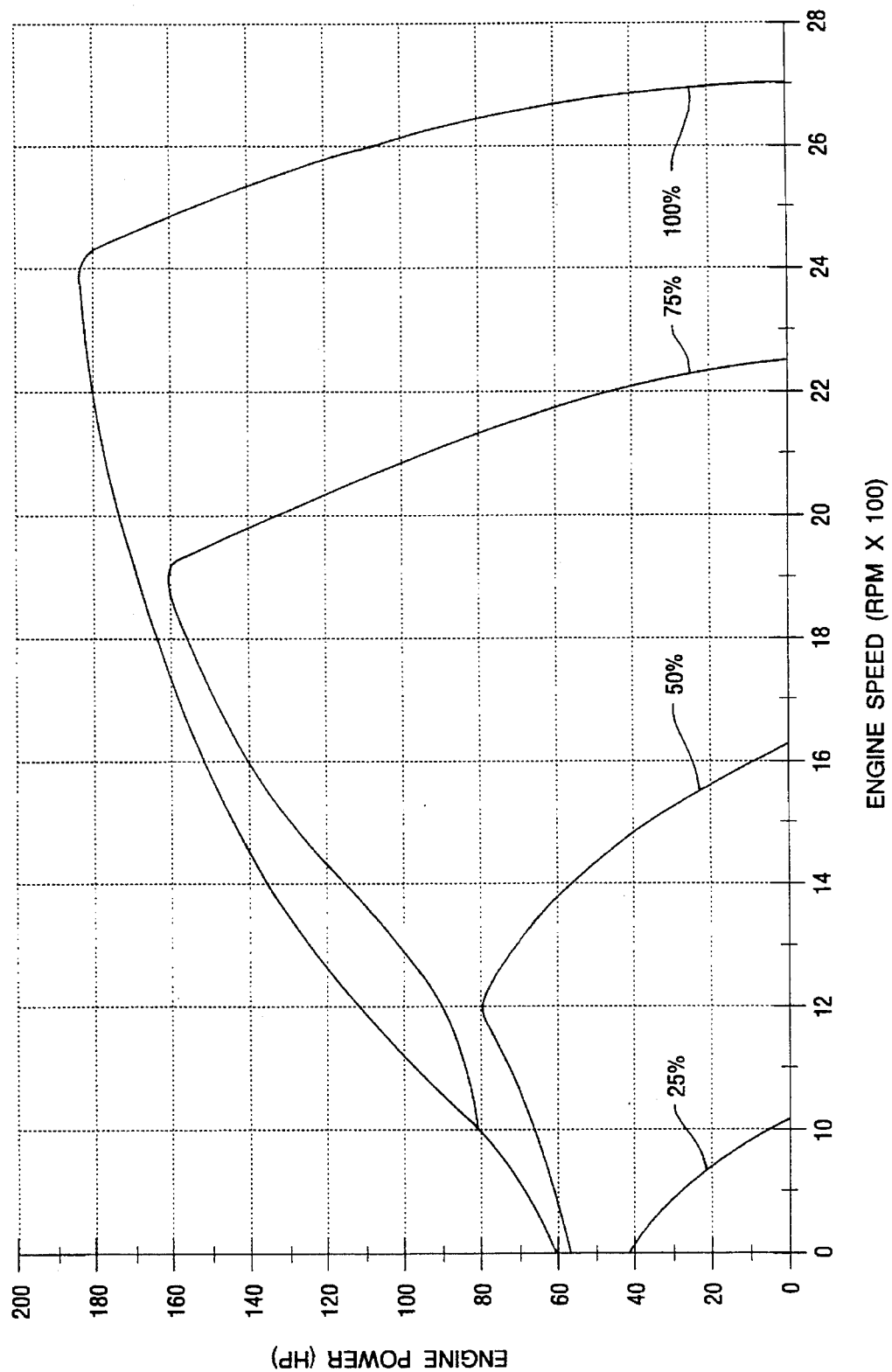
FIG. 3 is a chart of engine horse power versus engine speed for a typical engine of interest.

For a typical engine of interest, the engine speed at zero load is substantially linearly related to throttle position and consequently percent droop may be calculated on the basis of current throttle position data and engine speed data. If droop is greater than 20% the engine will be operating at full fuel or on the maximum horse power portion of the horse power versus engine speed curve. The horse power versus engine speed for a typical vehicle of interest at various throttle angular positions is shown in FIG. 3.

Vehicle acceleration is the result of the horse power available from the engine in excess of that which would be required to support the current grade and GVW at zero acceleration. Since the horse power available from the engine varies with engine speed, this excess horse power, or $\Delta$ HP, will also vary with engine speed. However, the variation in $\Delta$ HP is minimal over the engine speed range of 1300 to 2000 rpm for a typical engine of interest. Thus, the condition imposed by decision blocks 48 and 50 insure that vehicle acceleration is a good indicator of gross vehicle weight and grade environment.

Figure 4:
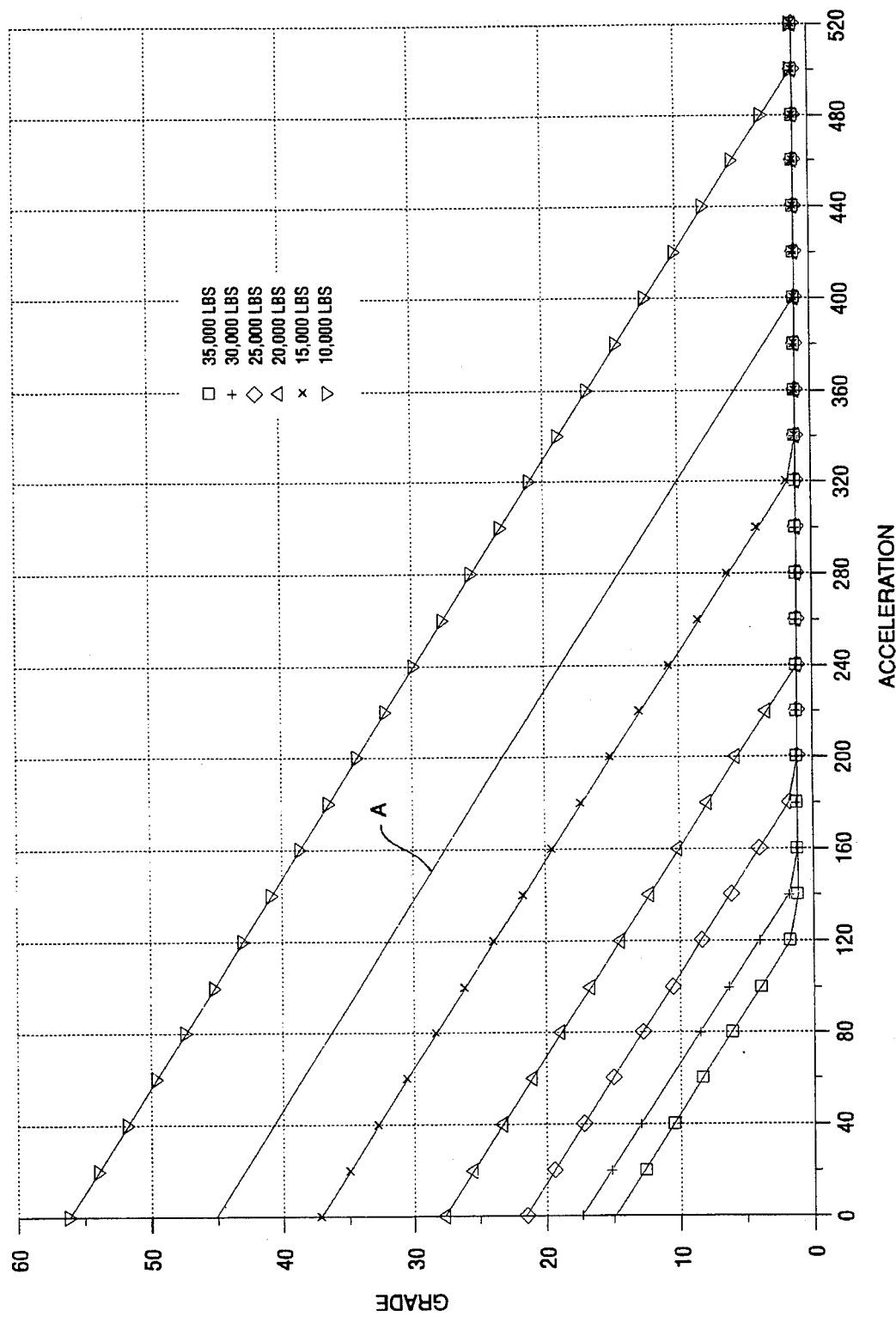
FIG. 4 is a chart of grade versus acceleration which is useful in explaining the procedure used to determine vehicle acceleration adjusted for grade.
Figure 5:
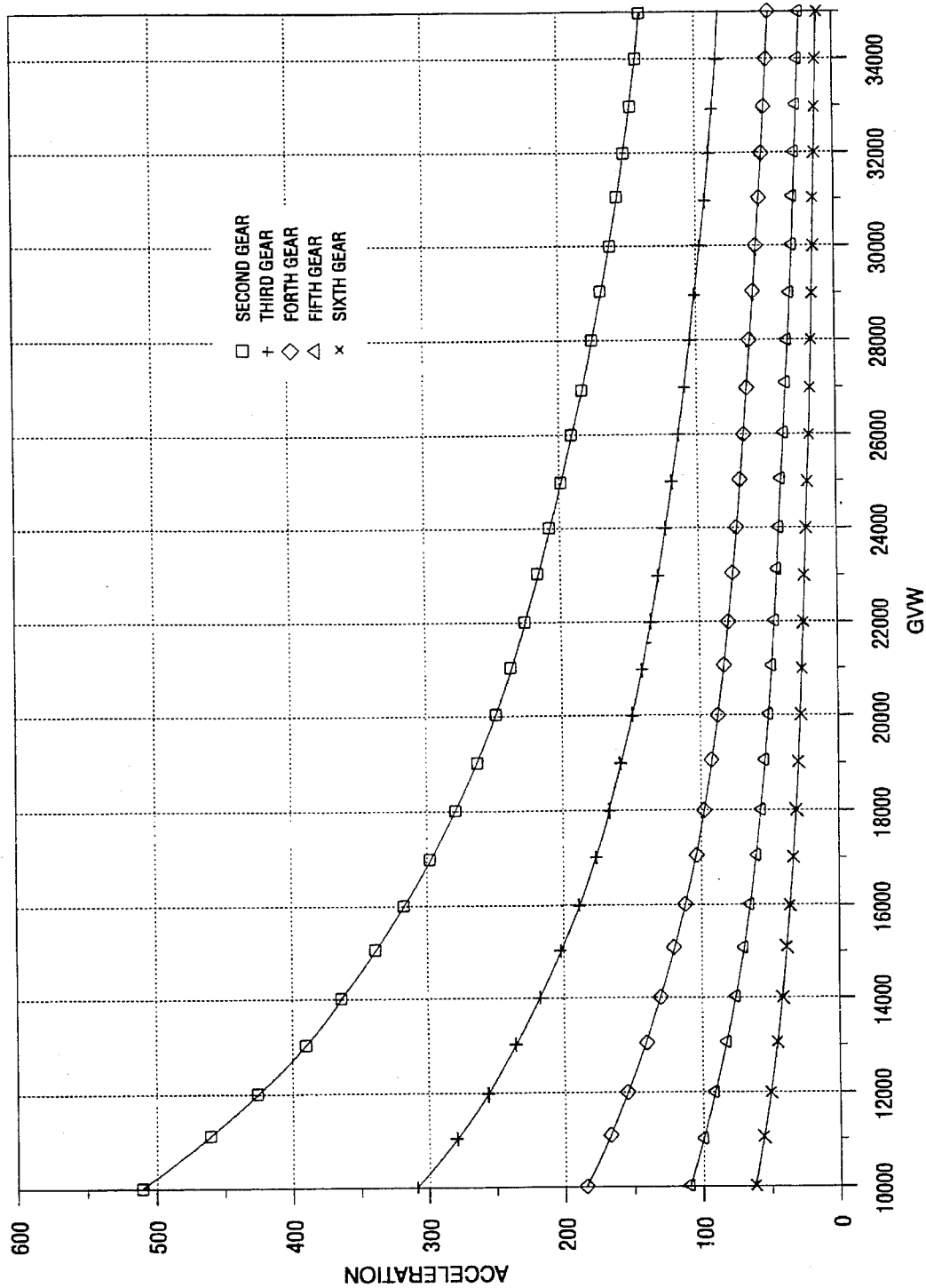
FIG. 5 is a chart of acceleration for 0% grade versus GVW for various transmission gears with the vehicle operating at a constant engine speed.

An adjustment of the value of acceleration calculated in block 52 is made in block 56 to arrive at a value of acceleration representative of a zero grade environment as opposed to the actual grade of the surface at the time of measurement. As shown in FIG. 4, the grade versus acceleration at various loads produces a family of parallel lines. The point where each line intersects the x axis represents the acceleration that this GVW would exhibit if the grade were 0%. The line A in FIG. 4 represents the GVW line which passes though the measured grade data and the calculated acceleration on that measured grade. The acceleration value where line A crosses the x axis corresponds to the acceleration at 0% for the GVW of interest and can be calculated from the following equation:

$$\alpha_0 = s * g + \alpha_m$$

where:
  $\alpha_0$=acceleration at 0% grade
  s=a constant slope
  g=measured grade
  $\alpha_m$=measured acceleration FIG. 5 shows acceleration for 0% grade versus GVW in gears two through six at a constant engine speed of 1600 RPM, for a vehicle of interest. The values for the family of curves shown in FIG. 5 are stored in a table in memory so that for any calculated acceleration a corresponding value of GVW may be looked up in the table, as shown in block 58. If the calculated acceleration is not in the table, then a conventional interpolation routine is run to arrive at the GVW based on GVW entries corresponding to acceleration entries above and below the calculated acceleration. As long as engine speed is between 1300 and 2000 RPM, as required by block 50, the entries for an engine speed of 1600 RPM, do not introduce any substantial error.

Once GVW has been determined, it is used along with a measurement of grade and vehicle speed to determine whether to initiate a gear shift. Basically, calculations of the horse power presently required and the horse power that would be available at the completion of a shift are made and compared in order to make this determination. The horse power at any point in time is proportional to the product of the grade, GVW and vehicle speed. While the horse power is also dependent on the frontal area of the vehicle and the rolling resistance of the road surface these variable are not specifically factored into the horse power determination. Instead a constant value of rolling resistance corresponding to that for a good concrete class 1 highway is assumed without introducing significant error.

The horse power available at completion of a shift is substantially linearly related to the speed of the engine at the completion of the shift. The engine speed at completion of the shift is proportional to the road speed at completion of shift which in turn is equal to the road speed at initiation of the shift corrected for the road speed reduction which will occur during the shift. The road speed reduction occurring during the shift is a function of the torque interrupt time and the deceleration, the latter being a function of the GVW and grade. Thus, from grade, GVW and torque interrupt data the engine speed at completion of the shift can be predicted. The horse power available at completion of the shift can be determined by solving a relatively simple equation based on the fairly linear relationship that exist between engine speed and engine horse power over the range of interest from approximately 1000 RPM to 2000 RPM, as shown in the 100% throttle curve of FIG. 3. If desired, greater accuracy can be achieved by storing actual values of horse power and engine speed in a lookup table.

If the horse power available at completion is greater than the horse power required at initiation as determined in the decision block 60 then a shift is initiated and the torque interrupt time, that is, the time to accomplish the shift is updated as indicated in block 62. Otherwise a shift is not initiated and the routine is repeated until conditions will permit a shift. It will be understood that the shift may be initiated automatically by the computer 20 or the computer may suggest to the operator through appropriate signals that a shift is desirable and the actual shift operation may be accomplished by the operator.

To summarize the mathematical relationships described above as they would be implemented in the computer:

$$HP_r = K_1(GVW * S_v) + K_2(Grade * GVW * S_v)$$

where
$HP_r$=Horse Power required at the wheels
$S_v$=vehicle speed
$K_1$ and $K_2$=constants $$HP_e = HP_r / DLE$$

where
$HP_e$=Horse Power required at the engine
DLE=Drive Line Efficiency $$F = K_3 * GVW + K_4(Grade * GVW)$$

where
F=Force at the wheels
$K_3$ and $K_4$=constants $$DEC = \frac{F * 32.2}{GVW}$$

where
DEC=Deceleration rate $$S_{vc} = S_v - K_5(TIT * DEC)$$

where
$S_{vc}$=Road speed at completion of shift
TIT=Torque Interrupt Time
$K_5$=constant $$S_{ec} = K_7 * S_{vc}$$

where
$S_{ec}$=Engine speed at completion of shift
$K_7$=constant $$HP_c = (0.1 * S_{ec}) - 30$$

where
$HP_c$=Horse power available at completion.

The relations discussed above will determine whether a shift may be initiated at the prevailing speed. However, driver demand as expressed by throttle position may require that the shift point be raised above some minimum engine speed in order to satisfy performance expectations of the driver. The driver's demand may be expressed as follows:

$$DEMAND = MIN\_VALUE + (\Delta TH / \Delta THmax) * RANGE$$

To maintain driveability, the vehicle should not be forced to operate at an engine speed below 1000 RPM for any gear except first gear. This is the minimum engine speed (MIN_VALUE) required at completion of the shift. Otherwise a shift should not be initiated. When the driver has the throttle pedal at 100% of the available throttle motion, maximum performance is obviously being commanded. To provide that performance, the shift point should generally be advanced to the rated speed of the engine. Vehicle acceleration will decrease sharply beyond rated speed and therefore there is little benefit in moving the shift point to a speed greater than rated speed, for example, 2400 RPM. The allowable range of shift points (RANGE), for a vehicle of interest, might then be 1000 RPM to 2400 RPM. The difference ($\Delta$ TH) between the engine speed associated with the current throttle position and the current engine speed is an indicator of whether the driver is satisfied with the current vehicle acceleration and speed. Dividing $\Delta$ TH by the engine speed at maximum travel of the throttle ($\Delta$ THmax) and multiplying this fraction by RANGE provides an amount which when added to MIN_VALUE adjusts the minimum speed for a shift to reflect the driver's demand.

The DEMAND relationship permits the shift point to be raised above the stated 1000 minimum within the bounds of the range and in proportion to throttle position, moving the shift point slightly at low throttle positions and aggressively at throttle positions near 100%.

The method of controlling the initiation of a gear shift may be summarized as follows:

a) when the engine is operating under conditions where vehicle speed and grade measurement are considered valid indicators of acceleration then acceleration is calculated and used with measured grade in approximating GVW;

b) the vehicle grade is continuously monitored and a minimum vehicle speed or shift point is identified for the present grade which will insure that the horse power available from the engine at the completion of the shift is equal to or greater than the horse power required at the initiation of the shift;

c) the minimum shift point is adjusted based upon driver's demand; and d) if the current vehicle speed exceeds the adjusted minimum shift point then a shift is initiated.

While the best mode for carrying out the invention has been described in detail, those familiar with the art to which this invention relates will recognize various alternative designs and embodiments for practicing the invention as defined by the following claims.

What is claimed is:

1. A method of controlling the initiation of a gear shift in an automated transmission of a vehicle comprising the steps of:
   a. measuring the grade of the vehicle while the vehicle is moving,
   b. measuring the vehicle speed on the grade,
   c. determining the gross weight of the vehicle as a function of the data obtained in steps (a) and (b),
   d. determining the horse power required to maintain the present vehicle speed, as a function of the gross vehicle weight, the present vehicle speed and present vehicle grade,
   e. predicting the engine speed at the completion of the shift as a function of the gross vehicle weight, vehicle grade, and torque interrupt time,
   f. determining the horse power available at the completion of a gear shift as a function of the predicted engine speed at the completion of the shift,
   g. initiating a shift only if the horse power available at completion of the shift is greater than the required horse power.

2. The method defined in claim 1 wherein step (c) includes the steps of:
   c1. determining the vehicle acceleration on the grade based on the vehicle speed data obtained over time from step (b),
   c2. adjusting the acceleration calculated in step (c1) to determine the acceleration the vehicle would exhibit for the existing gross vehicle weight if the vehicle grade were 0%, based on the measured grade determined in step (a).

3. The method defined in claim 2 comprising the steps of:
   measuring the engine speed,
   determining the engine droop as a function of measured engine speed,
   using a previously calculated value of gross vehicle weight, instead of the value determined in step c, in performing step d, unless the engine droop is greater than a predetermined percentage and engine speed is between predetermined upper and lower levels.

4. A method of controlling the initiation of a gear shift in an automated transmission of a vehicle comprising the steps of:
   a. measuring the present grade and speed of the vehicle while the vehicle is moving,
   b. determining the vehicle acceleration on the grade,
   c. determining the acceleration, $\alpha$, that the vehicle would exhibit for the existing gross vehicle weight if the vehicle grade were 0% based on the measured grade and the acceleration determined in steps (a) and (b),
   d. determining the gross weight of the vehicle as a function of the acceleration $\alpha$ determined in step (c),
   e. determining the horse power required to maintain present vehicle speed, as a function of the gross vehicle weight, the present vehicle speed and present vehicle grade,
   f. predicting the engine speed at the completion of the shift as a function of the gross vehicle weight, vehicle grade, and torque interrupt time,
   g. determining the horse power available at the completion of a gear shift as a function of the predicted engine speed at the completion of the shift,
   h. initiating the shift only if the horse power available at completion of the shift is greater than the horse power required.

5. A method of controlling the initiation of a gear shift in an automated transmission of a vehicle comprising the :steps of:
   a. measuring the grade of the vehicle while the vehicle is moving,
   b. measuring the vehicle speed on the grade,
   c. determining the gross weight of the vehicle as a function of the data obtained in steps (a) and (b),
   d. determining the horse power required to maintain present vehicle speed, as a function of the gross vehicle weight, the present vehicle speed and present vehicle grade,
   e. predicting the vehicle speed at the completion of a shift as a function of the gross vehicle weight, vehicle grade, and torque interrupt time, and predicting the engine speed at the completion of a shift as a function of predicted vehicle speed,
   f. determining the horse power available at the completion of a gear shift as a function of the predicted engine speed at the completion of the shift,
   g. initiating a shift only if the horse power available at completion of the shift will be greater than the present required horse power.

6. A method of controlling the initiation of a gear shift in an automated transmission of a vehicle comprising the steps of:
   a. measuring the grade of the vehicle while the vehicle is moving,
   b. measuring the vehicle speed on the grade,
   c. determining the gross weight of the vehicle as a function of the data obtained in steps (a) and (b),
   d. determining the horse power required to maintain the present vehicle speed, as a function of the gross vehicle weight, the present vehicle speed and present vehicle grade,
   e. determining the horse power available at the completion of the shift as a function of the gross vehicle weight, the present vehicle grade, and torque interrupt time,
   f. initiating a shift at the present vehicle speed only if the horse power available at completion of the shift will be greater than the present required horse power.

7. Apparatus for controlling the initiation of a gear shift in an automated transmission of a vehicle comprising:
   a. means for measuring the grade of the vehicle,
   b. means for measuring the vehicle speed on the grade,
   c. computer means programmed to determine the gross vehicle weight based on measured vehicle speed data and vehicle grade and to initiate a gear change at the present vehicle speed if the horse power available at the completion of the shift will be greater than the horse power required to maintain the present vehicle speed.

8. The invention defined in claim 7 wherein said computer is programmed to calculate vehicle acceleration based on vehicle speed data and to adjust the calculated vehicle acceleration to a zero grade environment and wherein said gross vehicle weight determination is based on said adjusted vehicle acceleration.

9. The invention defined in claim 8 wherein said computer is programmed to use a previously calculated value of gross vehicle weight in determining whether to .initiate a gear shift unless the engine droop is greater than a predetermined percentage and the vehicle engine speed is between predetermined upper and lower limits.

10. A method of determining whether a gear shift in an automated mechanical transmission of a vehicle should be initiated at the present speed of the vehicle comprising the steps of;

a. measuring the vehicle grade while percent engine droop is greater than a predetermined amount indicative of the engine operating at full fuel, and engine speed is between predetermined upper and lower engine speed value, b. approximating the gross vehicle weight as a function of the present acceleration of the vehicle on the measured vehicle grade, c. using the approximated gross vehicle weight and the measured grade to determine whether a gear shift should be initiated at the present vehicle speed.

11. The method defined of claim 10 wherein the determination made in step (c) is based on a calculation of the horse power required to maintain present vehicle speed, and the predicted horse power available at the completion of the shift, and the shift is not initiated unless the predicted horse power is equal to or greater than the horse power required to maintain the present vehicle speed.

12. The method of claim 11 wherein the predicted horse power is based on a predicted engine speed, and the said predicted engine speed must be greater than a predetermined minimum engine speed.

13. The method of claim 12 wherein said predetermined minimum engine speed is adjusted to reflect driver demand as indicated by throttle position.

14. The method of claim 13 wherein said predicted engine speed is a function of a predicted vehicle speed at the completion of a shift, said predicted vehicle speed being a function of the gross vehicle weight, vehicle grade, and torque interrupt time.

* * * * *

UNITED STATES PATENT AND TRADEMARK OFFICE
CERTIFICATE OF CORRECTION

PATENT NO. : 5,479,345
DATED : December 26, 1995
INVENTOR(S) : MARCEL AMSALLEN

It is certified that error appears in the above-indentified patent and that said Letters Patent is hereby corrected as shown below:

| | |
|---|---|
| Abstract, line 2 | Delete ":sensors" and insert --sensors--. |
| Column 1, line 2 | Delete "transmissions;" and insert -- transmissions--. |
| Column 1, line 15, | Delete "condition" and insert -- conditions--. |
| Column 3, line 62 | Delete "influence" and insert --influenced--. |
| Column 4, line 45 | Delete "though" and insert --through--. |
| Column 5, line 12 | Delete "variable" and insert --variables--. |
| Column 6, line 16 | Delete "$S_{ec}K_7*S_{vc}$" and insert --$S_{ec}=K_7*S_{vc}$--. |
| Claim 5, column 8, line 18, | Delete ":steps" and insert --steps--. |

UNITED STATES PATENT AND TRADEMARK OFFICE
CERTIFICATE OF CORRECTION

PATENT NO. : 5,479,345
DATED : December 26, 1995
INVENTOR(S) : MARCEL AMSALLEN

It is certified that error appears in the above-indentified patent and that said Letters Patent is hereby corrected as shown below:

Claim 9, column 9, line 12,     Delete ".initiate" and insert --initiate--.

Signed and Sealed this

Fourteenth Day of May, 1996

Attest:

BRUCE LEHMAN

Attesting Officer    Commissioner of Patents and Trademarks